Figure 1:
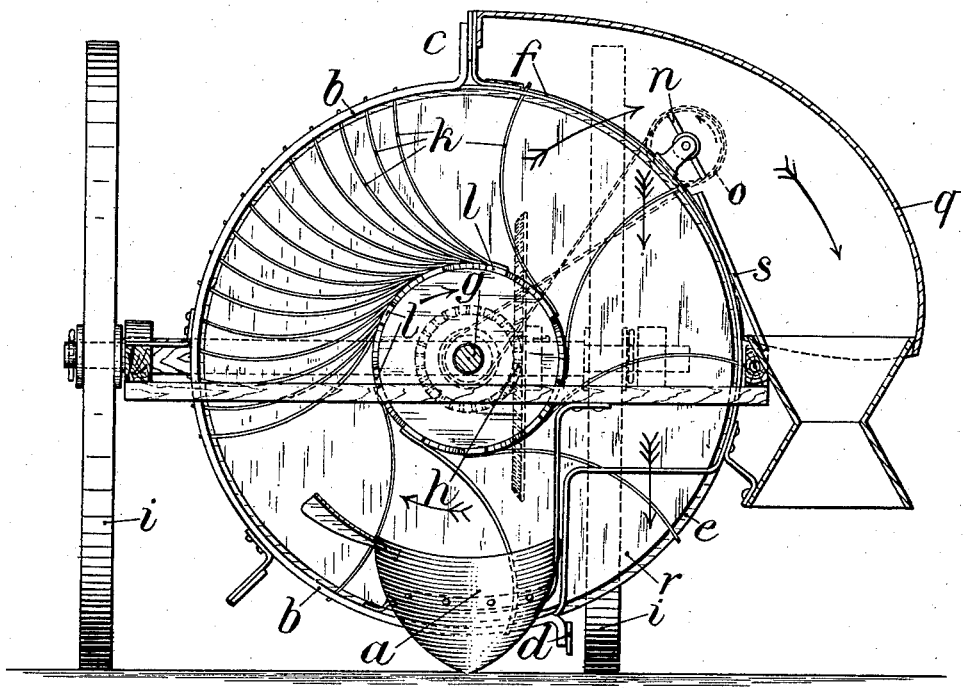

No. 687,478. Patented Nov. 26, 1901.
F. HABERLAND.
POTATO HARVESTING MACHINE.
(Application filed Mar. 16, 1901.)

(No Model.) 2 Sheets—Sheet 1.

WITNESSES:
Fred White
Thomas F. Wallace

INVENTOR:
Friedrich Haberland,
By his Attorneys.

No. 687,478.
F. HABERLAND.
POTATO HARVESTING MACHINE.
(Application filed Mar. 16, 1901.)
Patented Nov. 26, 1901.
(No Model.)
2 Sheets—Sheet 2.
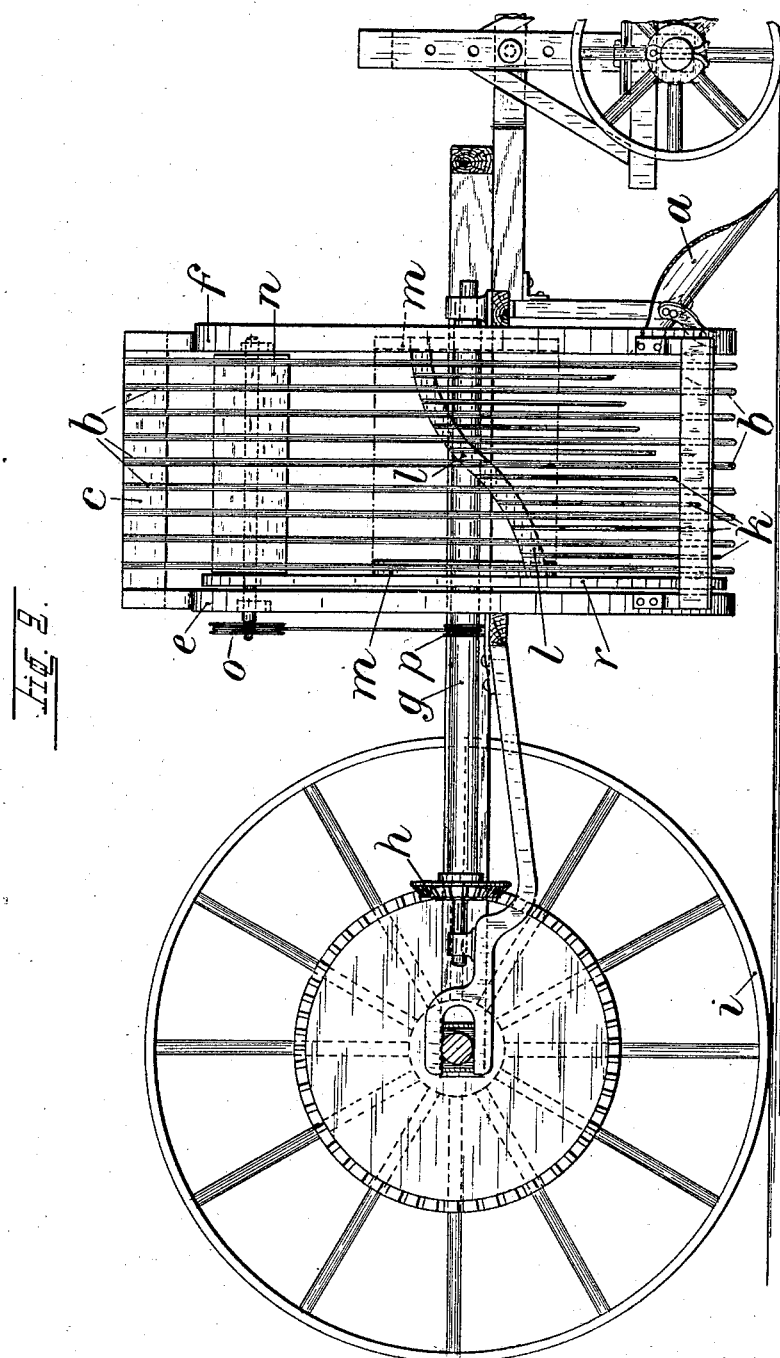
WITNESSES
Fred White
Thomas J. Wallace
INVENTOR:
Friedrich Haberland,
By his Attorneys

UNITED STATES PATENT OFFICE.

FRIEDRICH HABERLAND, OF GROSS-WEGENITZ, GERMANY.

POTATO-HARVESTING MACHINE.

SPECIFICATION forming part of Letters Patent No. 687,478, dated November 26, 1901.

Application filed March 16, 1901. Serial No. 51,442. (No model.)

*To all whom it may concern:*

Be it known that I, FRIEDRICH HABERLAND, a subject of the King of Prussia, Emperor of Germany, residing at Gross-Wegenitz, near Seehausen, Altmark, Germany, have invented certain new and useful Improvements in Potato-Harvesting Machines; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The invention relates to a potato-harvesting machine in which the fixed plowshare is mounted at the front lower end of a horizontal cylinder arranged in the longitudinal direction of the machine. This cylinder is made of wires bent in a semicircle and is open at one side. In the said cylinder is arranged a horizontal rotary shaft provided with blades or vanes which consist of separate wires secured in a spiral line on the shaft, some or all of these wires extending between the wires of the cylinder. By means of this arrangement the potato-plants slide up on the inclined plowshare, with their leafy parts directed forward at an angle, and are presented on their entrance into the cylinder to the blades or vanes in such a manner that the said blades act first on the root-stock surrounded by earth. At each contact or impact of a blade on the root-stock a piece is knocked off and thrown into the cylinder, while the whole plant is placed at an angle and pushed somewhat to one side. When the short root-stock is beaten off, the leafy part of the plant lies nearly transversely to the plowshare or cylinder and is then thrown down sidewise in front of the cylinder by the plowshare. The leafy part itself thus never comes into the machine, so that the principal cause of the breakdowns which are continually occurring in the potato-harvesting machines heretofore constructed are entirely obviated in my improved machine. The parts of the root-stock beaten off by the blades in the cylinder are carried up by the said blades into the cylinder, during which operation the earth is shaken out between the wires of the cylinder, while the potatoes are thrown at the upper open end of the cylinder against a guide-wall and from there are conducted into a collector or receptacle. The weeds contained in the root ball or clod fall down on the open side of the cylinder.

A machine of this kind is shown in the accompanying drawings with the fore carriage removed.

In the drawings, Figure 1 is a front elevation, partly in section; and Fig. 2, a side elevation.

The plowshare $a$ is mounted at the front end of the fixed horizontal sieve-cylinder $b$, which is arranged in the longitudinal direction of the machine, is open at one side, and is made of wires curved in a circular arc. These wires, as shown in Fig. 1, are secured at their outwardly-bent ends to bars $c$ and $d$ of the frame in such a manner that the said bars lie outside the walls of the cylinder. The bars $c$ and $d$ are secured at their front ends to the ring $f$, forming the front edge of the cylinder, and at their rear ends to the disk $e$, closing the cylinder at the back.

A horizontal shaft $g$ is arranged in the cylinder $b$, this shaft being driven by means of the bevel-wheels $h$ from the wheels $i$ of the machine. The said shaft in the example shown bears a drum $m$, on the periphery of which are secured spirally-wound bars $l$ for the reception of blades $k$, consisting of separate wires. These wires lie tangentially to the drum $m$ at their inner ends and are gently curved forward in the direction of motion, as shown in Fig. 1. Each blade thus presents a spiral surface formed from separate wires, which has the tendency to push to the rear the materials fed into the cylinder and at the same time carry them along in the direction of rotation. Some or all of the wires of the blades $k$ are made long enough to extend between the wires of the sieve-cylinder, whereby the latter are continually kept clean.

The drum $m$ in the example shown is provided with nine blades $l$, of which, for the sake of clearness, only one is completely shown, while only the foremost wire is shown of each of the remaining blades.

Over the upper open side of the sieve-cylinder $b$ is mounted a guide-cap $q$, the lower part of which is separated from the sieve-cylinder by a partition-wall $s$. At the upper end of this separating-wall is arranged a rotary bar *n*, which is driven, by means of the cord-pulleys *o* and *p*, from the shaft *g*, and has the object of preventing any weeds which may be carried up by the blades from setting fast or jamming in front of the partition-wall *s*.

The method of operation of the machine is as follows: By reason of the inclined position of the plowshare *a* the root-stock—that is to say, the ball of earth on the plant in which the potatoes are inclosed, the leafy part of the plant extending obliquely outward—first comes within reach of the rotating blades *k* in the cylinder *b*. Each blade will beat off a piece of the ball and throw it into the cylinder, in which operation the plant is always pushed somewhat to one side on the plowshare until the whole ball is beaten off, whereupon the leafy part is thrown down sidewise in front of the cylinder *b* from the plowshare. The leafy part thus never reaches the interior of the machine, so that the breakdowns taking place in the machines heretofore known from setting fast of the leaves in the machine are entirely avoided. The earth and potatoes entering the sieve-cylinder are pushed to the rear by the blades *k* and simultaneously elevated, in which operation the clods of earth are so reduced in size by their passage across the wires of the sieve-cylinder *b* that the earth is thrown out between the wires of the said cylinder. The potatoes carried along by the blades *k* are thrown out tangentially at the upper open end of the cylinder against the guide-cap *q* and are conducted thereby down through a funnel, where they can be collected in a box which is arranged beneath the funnel and not shown in the drawings. This path followed by the potatoes is indicated in Fig. 1 by double-feathered arrows. The weeds, couch-grass, &c., carried into the sieve-cylinder with the earth, since they are lighter than the potatoes, are not thrown through the opening in the sieve-cylinder arranged above the partition-wall *s*, but fall down in the direction of the triple-feathered arrow on the open side of the cylinder.

The bar *n*, arranged above the partition-wall *s*, has the object of preventing any setting fast of the weeds at this place.

Having thus described particularly my invention, what I claim, and desire to secure by Letters Patent, is—

1. A potato-harvesting machine, characterized by a sieve-cylinder *b* arranged horizontally behind the plowshare in the longitudinal direction of the machine and open at one side, which cylinder is made of wires curved in a circular arc, and is provided internally with a rotary shaft bearing blades *k* which consist of spirally-arranged wires, the said parts adapted to operate in such a manner that as the shaft rotates the root-ball of the potato-plant is beaten away piecemeal and is fed into the cylinder, while the leafy part is thrown out in front of the cylinder, and the potatoes separated from the earth are thrown out at the upper end of the lateral opening of the cylinder into a guide-cap, while the weeds contained in the earth fall down in the part of the sieve-cylinder which is open at the side.

2. A potato-harvesting machine, characterized by a sieve-cylinder *b* arranged horizontally behind the plowshare in the longitudinal direction of the machine and open at one side and having a lateral opening, which cylinder is made of wires curved in a circular arc, and is provided internally with a rotary shaft bearing blades *k* which consist of spirally-arranged wires, some or all of them extending between the wires of the sieve-cylinder, in order to keep the same always clean and externally with a guide-cap opposite said lateral opening, the said parts adapted to operate in such a manner that as the shaft rotates the root-ball of the potato-plant is beaten away piecemeal and is fed into the cylinder, while the leafy part is thrown out in front of the cylinder, and the potatoes separated from the earth are thrown out at the upper end of the lateral opening of the cylinder into said guide-cap, while the weeds contained in the earth fall down in the part of the sieve-cylinder which is open at the side.

3. A potato-harvesting machine, characterized by a sieve-cylinder *b* arranged horizontally behind the plowshare in the longitudinal direction of the machine and open at one side and having a lateral opening, which cylinder is made of wires curved in a circular arc, and is provided internally with a rotary shaft bearing blades *k* which consist of spirally-arranged wires and externally with a guide-cap opposite said lateral opening, the said parts adapted to operate in such a manner that as the shaft rotates the root-ball of the potato-plant is beaten away piecemeal and is fed into the cylinder, while the leafy part is thrown out in front of the cylinder, and the potatoes separated from the earth are thrown out at the upper end of the lateral opening of the cylinder into said guide-cap, between which and the cylinder is arranged a partition-wall *s* at the upper end of which is arranged a rotary bar *n* in order to prevent setting fast of the weeds at this place.

In witness whereof I have hereunto signed my name in the presence of two subscribing witnesses.

FRIEDRICH HABERLAND.

Witnesses:
JOHANNES HEIN,
WOLDEMAR HAUPT.